(12) United States Patent  
Cook et al.

(10) Patent No.: US 9,336,015 B2  
(45) Date of Patent: May 10, 2016

(54) SYSTEM AND METHOD FOR ACTION OUTPUT/PAGE INPUT MISMATCH DETECTION AND RESOLUTION

(75) Inventors: Thomas A. Cook, Boulder, CO (US); Troy Beecroft, Broomfield, CO (US); Thomas Carl Stamm, Louisville, CO (US); James Barnett, Boulder, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1467 days.

(21) Appl. No.: 11/527,988

(22) Filed: Sep. 27, 2006

(65) Prior Publication Data

US 2007/0079285 A1 Apr. 5, 2007

Related U.S. Application Data

(60) Provisional application No. 60/721,148, filed on Sep. 27, 2005.

(51) Int. Cl.

| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |

(Continued)

(52) U.S. Cl.
CPC ........ *G06F 9/4443* (2013.01); *G06F 17/30882* (2013.01)

(58) Field of Classification Search
CPC ............ G06F 9/4443; G06F 17/30882; G06F 17/4443
USPC .......... 715/234, 764, 229; 717/113, 104, 162; 714/38

See application file for complete search history.

(56) References Cited

U.S. PATENT DOCUMENTS 5,430,873 A 7/1995 Abe et al.
6,289,382 B1 9/2001 Bowman-Amuah (Continued)

OTHER PUBLICATIONS

Novell, Inc., Novell Extend Director 5.2 Pageflow and Form Guide, Jun. 2004, Novell, Inc., pp. 1-180.

(Continued)

*Primary Examiner* — Manglesh M Patel
*Assistant Examiner* — Nicholas Hasty
(74) *Attorney, Agent, or Firm* — Tucker Ellis LLP (57) ABSTRACT

The present invention enables a three-pane page flow editor optimized for viewing and editing a page flow. It provides a visual representation of nodes/actions and the connections among them, enabling the ability to read and edit connections between nodes in a local area of the page flow without the overlaps between lines and crossovers once the page flow grows complex in real applications. In addition, it detects and resolves mismatches between annotations of a plurality of action outputs—representing data that an action can provide to a page, and a plurality of page inputs—representing data required by a page in the page flow. This description is not intended to be a complete description of, or limit the scope of, the invention. Other features, aspects, and objects of the invention can be obtained from a review of the specification, the figures, and the claims.

20 Claims, 7 Drawing Sheets (51) Int. Cl.
*G06F 3/048* (2013.01)
*G06F 9/44* (2006.01)
*G06F 17/30* (2006.01)

(56) References Cited

U.S. PATENT DOCUMENTS

| | | | |
|---|---|---|---|
| 6,308,178 B1 | 10/2001 | Chang et al. | |
| 6,549,221 B1 | 4/2003 | Brown et al. | |
| 6,601,233 B1* | 7/2003 | Underwood | 717/102 |
| 6,633,878 B1* | 10/2003 | Underwood | 707/999.001 |
| 6,701,513 B1 | 3/2004 | Bailey | |
| 6,804,686 B1 | 10/2004 | Stone et al. | |
| 6,812,941 B1 | 11/2004 | Brown et al. | |
| 6,973,625 B1 | 12/2005 | Lupo et al. | |
| 7,051,069 B2* | 5/2006 | Smithline et al. | 709/203 |
| 7,069,507 B1* | 6/2006 | Alcazar et al. | 715/202 |
| 7,131,107 B2 | 10/2006 | Wall et al. | |
| 7,296,297 B2 | 11/2007 | Kirkpatrick et al. | |
| 7,325,014 B1 | 1/2008 | Kennedy | |
| 7,376,891 B2 | 5/2008 | Hitchcock et al. | |
| 7,392,267 B2* | 6/2008 | Cragun et al. | 707/999.203 |
| 7,448,024 B2* | 11/2008 | Breeden et al. | 717/125 |
| 7,496,891 B2* | 2/2009 | Bou-Ghannam et al. | 715/230 |
| 7,499,956 B1* | 3/2009 | Darcy et al. | 707/203 |
| 7,542,957 B2 | 6/2009 | Roy et al. | |
| 7,546,576 B2* | 6/2009 | Egli | 717/106 |
| 2001/0007139 A1 | 7/2001 | Murray | |
| 2002/0032706 A1 | 3/2002 | Perla et al. | |
| 2002/0073236 A1* | 6/2002 | Helgeson et al. | 709/246 |
| 2002/0130907 A1 | 9/2002 | Chi et al. | |
| 2002/0138556 A1 | 9/2002 | Smithline et al. | |
| 2002/0184616 A1 | 12/2002 | Chessell et al. | |
| 2003/0004746 A1* | 1/2003 | Kheirolomoom et al. | 705/1 |
| 2003/0023953 A1 | 1/2003 | Lucassen et al. | |
| 2003/0023957 A1* | 1/2003 | Bau et al. | 717/140 |
| 2003/0073236 A1* | 4/2003 | Field et al. | 435/455 |
| 2003/0084120 A1* | 5/2003 | Egli | 709/218 |
| 2003/0149722 A1* | 8/2003 | Jolley | G06F 17/30581 709/203 |
| 2004/0068568 A1 | 4/2004 | Griffin et al. | |
| 2004/0225995 A1* | 11/2004 | Marvin et al. | 717/100 |
| 2005/0033717 A1* | 2/2005 | Ellis et al. | 707/1 |
| 2005/0060685 A1 | 3/2005 | Franz et al. | |
| 2005/0114771 A1* | 5/2005 | Piehler | G06F 17/21 715/264 |
| 2005/0138641 A1 | 6/2005 | Kobylinski et al. | |
| 2005/0182768 A1 | 8/2005 | Waldorf et al. | |
| 2005/0240863 A1* | 10/2005 | Olander et al. | 715/513 |
| 2006/0031750 A1 | 2/2006 | Waldorf et al. | |
| 2006/0101346 A1 | 5/2006 | Denzlein | |
| 2006/0206856 A1* | 9/2006 | Breeden | G06F 8/20 717/101 |
| 2006/0235548 A1 | 10/2006 | Gaudette | |
| 2007/0043832 A1 | 2/2007 | Sane | |
| 2009/0183141 A1* | 7/2009 | Tai et al. | 717/124 |

OTHER PUBLICATIONS

Cardone et al., Using XForms to Simplify Web Programming, May 10-14, 2005, ACM International World Wide Web Conference Committee, pp. 215-224.

Ricca et al., Analysis and Testing of Web Applications, Aug. 7, 2002, ICSE 2001 Proceedings of the 23rd International Conference on Software Engineering, pp. 25-34.

Cugini et al., VISVIP: 3D Visualization of Paths Through Web Sites, Aug. 6, 2002, Tenth International Workshop on Database and Expert Systems Applications, pp. 259-263 (pp. 1-5 of unnumbered provided copy).

* cited by examiner

SYSTEM AND METHOD FOR ACTION OUTPUT/PAGE INPUT MISMATCH DETECTION AND RESOLUTION

CLAIM OF PRIORITY

This application claims benefit from U.S. Provisional Patent Application No. 60/721,148, filed Sep. 27, 2005, entitled "Page Flow Editor" by Thomas A. Cook et al.

CROSS-REFERENCE TO RELATED APPLICATIONS

This application is related to the following co-pending applications which are hereby incorporated by reference in their entirety:

U.S. patent application Ser. No. 11/528,062, entitled SYSTEM AND METHOD FOR PAGE FLOW EDITOR, by Thomas A. Cook, et al., filed Sep. 27, 2006 now U.S. Pat. No. 8,078,954, issued Dec. 13, 2011 and;

U.S. patent application Ser. No. 11/527,884, entitled SYSTEM AND METHOD FOR DECLARATIVE VALIDATION RULE EDITOR, by Thomas A. Cook, et al., filed Sep. 27, 2006, abandoned.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to the field of page flow exploration and editing.

BACKGROUND

Figure 1:
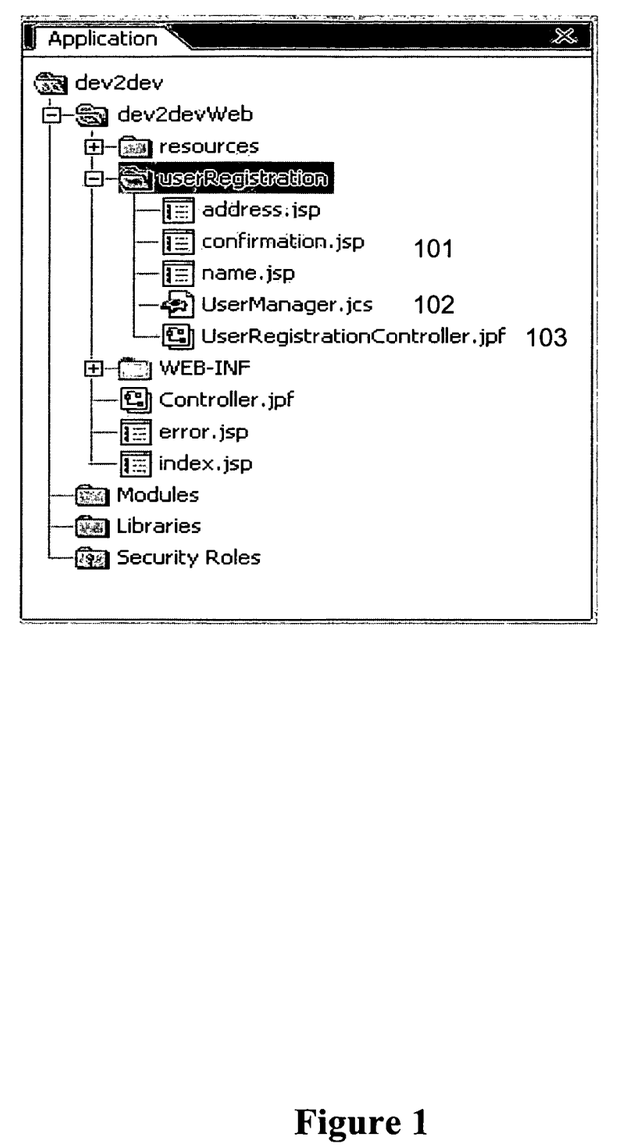
FIG. 1 shows an exemplary page flow implementing a Web application's user registration wizard feature as displayed in a page flow explorer.

A page flow is a collection, set or directory of Web application files that work together to implement a user interface (UI) feature. It allows a software developer to separate user interface code from navigational control and other business logic. User interface code can be placed where it belongs (e.g., in JSP files). Navigational control can be implemented easily in a page flow's single controller file, which is the nerve center of (a component of) a Web application. A page controller file is a special Java file that uses an annotation such as @Jpf Controller. Business logic can be implemented in the page controller file, or in Java controls that are called from controller files. For a non-limiting example, a page flow could implement a Web application's user registration wizard feature. The files of such a page flow could be arranged in an exemplary "userRegistration" directory shown in FIG. 1, which contains several *.jsp files 101, a control file 102. The *.jsp files are standard Java Server Pages (JSP) files that contain markup that describes the visual aspect of the user registration wizard. A Java control file contains annotated Java code that implements logic used by the user registration wizard. The *.jpf file contains annotated Java code that implements the navigation and state management logic of the user registration wizard and that makes calls to business logic.

A page flow explorer provides a consistent means of locating and managing all artifacts (components, actions, or files) related to a given page flow via graphical and code-level tools to simplify the development cycle, whether editing the controller files or the member pages. The tree view of the explorer can be presented as a page flow graph (tree) that consolidates functions previously dispersed among the project tree, structure pane, data palette, property sheet, design palette, controls, and action view. The source view of the explorer presents syntax completion, validation, and other programmer's aids reduce the amount of work required to get your application running. Many artifacts are represented by nodes in the page flow graph. While the explorer view of the page flow is useful for doing basic management of the page flow related artifacts, it lacks features necessary to support complete editing of the page flow.

DETAILED DESCRIPTION

The invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

Various embodiments of the present invention enable a three-pane page flow editor optimized for viewing and editing a page flow. It centers around a selected focal node referenced in the page flow editor, shows details and allows editing in the vicinity of the node. It provides a visual representation of nodes and the connections among them, enabling the ability to read and edit connections between nodes in a local area of the page flow without the overlaps between lines and crossovers once the page flow grows complex in real applications. Consequently, user can edit a page flow via dragging and dropping of entities instead of switching back and forth between the two design views, or a design view and source view. Additionally, an action output annotation editor detects and resolves mismatches between annotations of a plurality of action outputs—representing data that an action can provide to a page, and a plurality of page inputs—representing data required by a page in the page flow.

Various embodiments of the present invention provides at least the following capabilities for the page flow editor:

A clear local picture of inputs and outputs for a given node, uncluttered by irrelevant nodes and links.

A canned, standardized layout where every link is easy to locate, select, and edit.

A place to put additional details, such as global forwards raised by an action, that would otherwise unduly clutter the main view.

A way to dynamically trace paths through the flow using in a sequential frame presentation, similar to time-based media editors.

A unified context for editing both JPF and JSP files.

A means of quickly navigating to various source artifacts that make up a page flow.

An integration with source view for a less disjointed overall editing experience.

Figure 2:
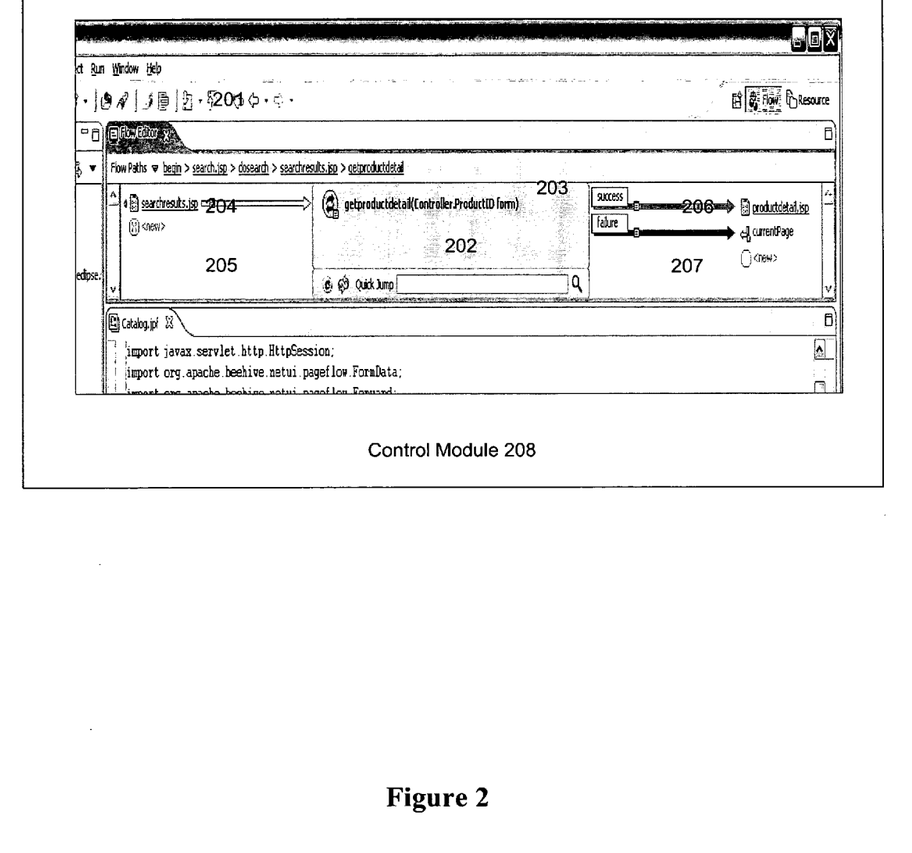
FIG. 2 is an illustration of an exemplary page flow editor in one embodiment of the present invention.

FIG. 2 is an illustration of an exemplary page flow editor in one embodiment of the present invention. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 2, the central section (pane) 202 of the page flow editor 201 shows details of the current node 203 and navigation in the flow editor is based on bringing a given node into view in this central section. Initially, the current node is the begin action when editing a page flow (if it exists in the page flow, otherwise, it can be another local action). It is, in essence, the "home" node for a page flow, much like a "home" page on a Web site. The upstream 204 and downstream 206 connections (links, forwards) and nodes of the current node in the page flow are shown in the sections to the left 205 and right 207 of the center section, respectively. In addition, the left and right sections provide locations for creating additional links, reconnecting existing links, or deleting existing upstream links upstream or downstream. The entire page flow editor is supported by an independent underlying control module 208 behind this view, which provides navigational control and other business logic to support the page view on top of it.

Figure 3:
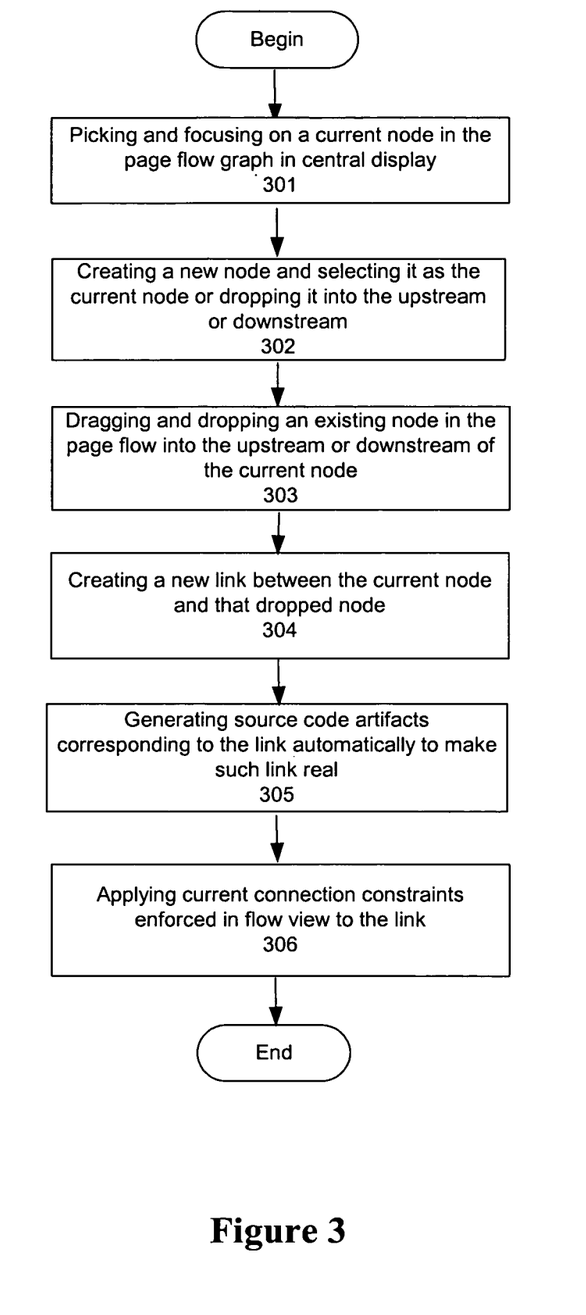
FIG. 3 is a flow chart illustrating an exemplary page flow editing process via in accordance with one embodiment of the invention.

FIG. 3 is a flow chart illustrating an exemplary page flow editing process in accordance with one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 3, a current node in the page flow graph is picked and focused on in central display at step 301. Optionally, a new node can be created before it is selected as the current node or dropped into the upstream or downstream section at step 302. An existing node in the page flow can be dragged and dropped into the upstream or downstream of the current node at step 303, and a new link can be created between the current node and that dropped node at step 304. Dragging the node into the downstream means the dropped node is the destination end of the link, while dragging the node into the upstream means the dropped node is on the source side of the link. Source code artifacts corresponding to the link are generated automatically to make such link real at step 305 and current connection constraints as enforced in flow view is applied to the link at step 306.

In some embodiments, nodes that are inherently terminal and can only have a single upstream reference, which include but are not limited to, return node, an unspecified node, can never be the focal node; they only appear in the downstream section. Exit node nodes can have multiple upstream nodes, but will never be the focal node. Nodes that are inherently terminal but support more than one upstream reference—such as a shared flow action, external page flow, or external page—are allowed as focal nodes since this is the only way to easily see all the nodes that refer to them.

In some embodiments, a user can move upstream or downstream in the page flow following path through the graph by clicking the link portion of an upstream or downstream node. The clicked node then becomes the new current node and is displayed in the central section. A user can also jump to other nodes in the page flow by specifying the name of the node to jump to, or dragging a node from the page flow tree and dropping it into the central section.

In some embodiments, a user can reattach a link via a context menu on the link itself, or by dragging and dropping of the new destination node onto the existing destination node. An existing link to the current node can also be deleted in the similar manner. The node in the upstream or downstream section, however, should be removed from view since it no longer has an association with the current node.

In some embodiments, the page flow editor supports the displaying of source code and/or the annotation metadata of the corresponding artifacts/actions (nodes), wherein the artifacts and the links to the nodes in the page flow view is automatically updated to be in sync with any change made in the source code.

In some embodiments, several artifacts can be registered with the page flow if they are dragged from the project tree, although most drags onto the page flow editor originate from the page flow. Such artifacts include but are not limited to, external pages, html files, plain text files, other existing page flows, controls, shared flow and message bundles.

Figure 4:
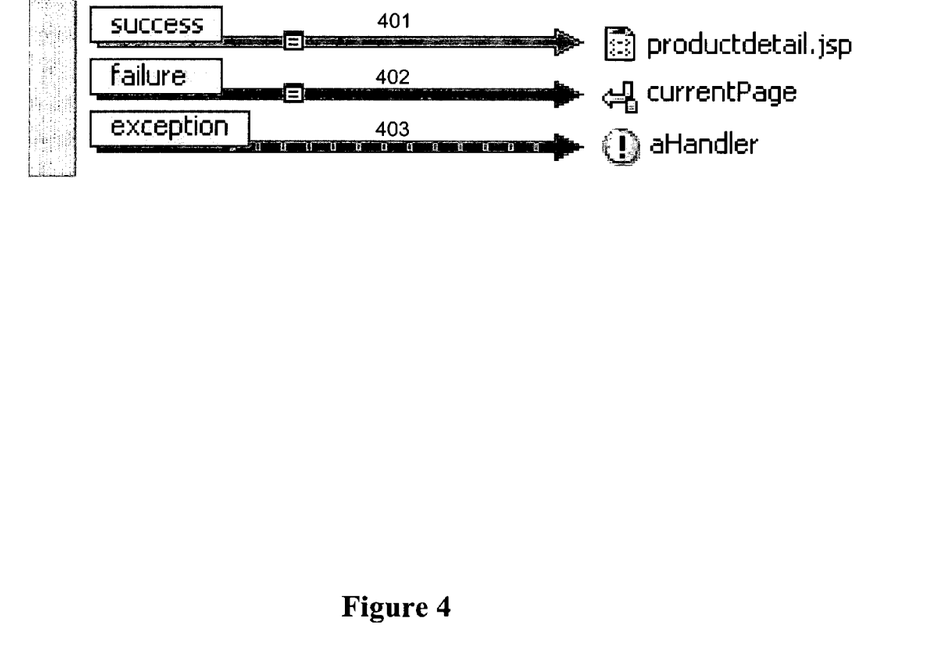
FIG. 4 is an illustration of different types of links in a page flow editor in one embodiment of the present invention.

In some embodiments, the page flow editor makes distinction among different link types, showing different representations of forwards (success) 401, validation error forwards (failure) 402, and catches (exception forwards) 403 as shown in FIG. 4. The states of the links such rollover and selection states can be associated with the corresponding links.

Figure 5:
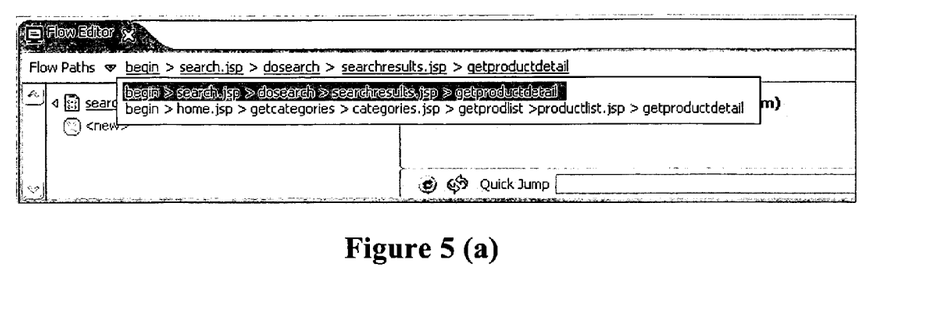
FIG. 5(a)-(b) is an illustration of an exemplary flow path graph in one embodiment of the present invention.

In some embodiments, the page flow editor also supports a flow path section of the editor, which displays the path(s) from the begin node in the page flow to provide additional context around the current node as shown in FIG. 5(a)-(b). It also provides a quick means of navigating upstream by allowing the user to select which path to display. The selected path is then rendered as a set of links.

In some embodiments, the page flow editor also supports a plurality of node types as listed below:

Return Nodes. These nodes reflect the NavigateTo attribute on an annotation, providing for symbolic navigation.

Exit Nodes. These nodes reflect the returnAction attribute on an annotation in a nested page flow. It designates the action to be raised in a nesting page flow upon a particular completion path of the nested flow.

Mystery Nodes. These nodes reflect an empty path attribute on an annotation.

In some embodiments, the page flow editor supports refactoring across multiple programming languages and files. Once a node in the page flow is renamed, the underlying model of the page flow editor will fix references to the node across files and languages in the page flow so that every reference to the node is in sync. Such cross file and platform refactoring is performed transparent to the page flow display and the user.

Action Output/Page Input Mismatch Detection and Resolution

Figure 6:
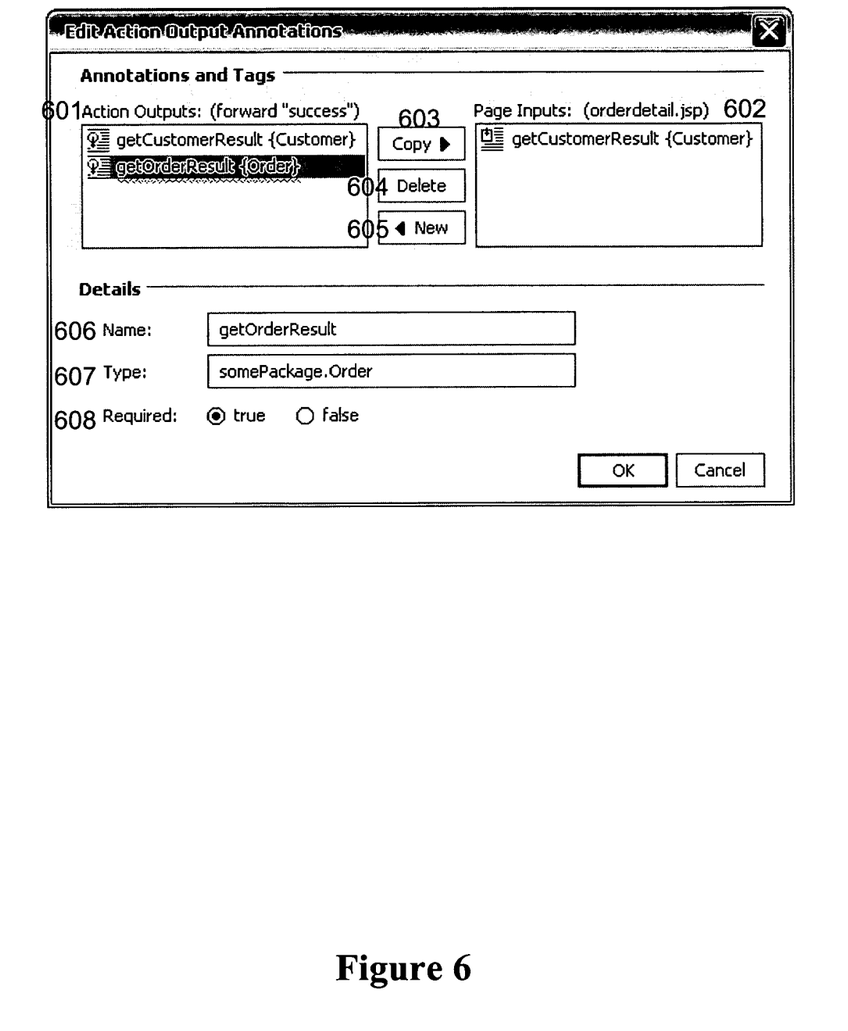
FIG. 6 is an illustration of an exemplary action output annotation editor in one embodiment of the present invention.

In some embodiments, the page flow editor provides the ability to indicate what data a page expects to receive in order to help users to manage data flow in page flow. Additionally, annotations on actions can be introduced, which document what data is being passed on a given forward. To help users ensure that both sides of this data contract are in agreement, the page flow editor is capable of detecting mismatches and showing corresponding diagnostics. An action output annotation editor as shown in FIG. 6 is offered to facilitate resolving mismatches between annotations of a plurality of action outputs—representing data that an action can provide to a page, and a plurality of page inputs—representing data required by a page in the page flow. It is also handy for general purpose editing of both sets of annotations from one convenient place. As Web pages can declare what data they need and the code behind them can declare what data is available, the action output annotation editor helps match them up or detect and indicate a mismatch that must be remedied by changing either the code behind the web pages or the web pages themselves.

In some embodiments of a page flow editor, the action output annotation editor can be launched from a page and/or by invoking the context menu on a forward. It comprises of one or more of the following components:

Action Outputs List 601: which has one entry for each action output annotation on the forward, and the list items carry the value of the name attribute of the action output annotation. In the list, the type should be restricted to just the class name.

Page Inputs List 602: which has one entry for each page input in the page that is being forwarded to. When forwarding to a page the filename will appear in parentheses above the list box. If the path attribute is set to something other than a page node, the list is disabled and the label above the list box reads "<no page>". The label of the page input items in the list carries the value of the name attribute of the tag, e.g., declarePageInput.

Copy Button 603: which makes a copy of the selected item from one list in the other list. Consequently, the function is directional based on which list has the selection, where the arrow should always point away from the list with the selection. If there is no selection in either list, the button is disabled and no arrow shows.

Delete Button 604: which deletes the selected item(s), in whichever list holds them. If there is no selection in either list, the button is disabled.

New Button 605: which creates a new annotation in the pointed to list and the arrow on the button points to whichever list has the selection. If neither list has a selection, as in the case of one or both lists being empty, the arrow is set when a list gets focus.

Name Field 606: which holds the name of the selected annotation, which must have a valid value or OK is disabled.

Type Field 607: which holds the type of the data object, which must have a valid value or OK is disabled. Ideally, direct input is allowed as well as class picker help.

Required Option 608: which reflects the setting of the "required" attribute on either the page input or action output. In most cases the attribute will not have been set, so the attribute should be actually generated if its value has been changed from the default.

In some embodiments, the action outputs list and the page inputs list share some common behaviors:

They are complimentary in terms of selection, i.e., selecting an item in one list clears the selection in the other list.

Both lists can be single select with the fields in the details section disabled, meaning that copy and delete functions would apply to all selected items.

Invalid entries for attributes on the action output or page input shouldn't be allowed.

In some embodiments, the action output annotation editor is operable to handle parameterized types, which enables users not have to repeatedly disambiguate generic types. An "action output" annotation can preserve the parameterized types on a "type hint" attribute, in addition to keeping the base type in the type attribute. A "declare Page Input" tag can keep the parameterized types on the same type attribute it normally uses. Thus, when dealing with parameterized types, there are two attributes to manage on the action output.

In some embodiments, the action output annotation editor is operable to deal with parameterized types based on the following rules:

1. The editor is operable to read and parse the elements of a parameterized type.
2. When validating a parameterized type, error messaging must identify whether the base or parameter type is invalid. This is probably best accomplished by including the type in the error message, e.g., "somePackage.BadType is not a valid type".
3. When "type hint" is present on a valid action output, it should be used as the source of record when determining mismatches. The "type hint" value will be shown in the Type field of the editor when the action output is selected. If an action output contains a type and "type hint" with mismatched base types, use the type attribute as the source of record instead.
4. A "type hint" attribute is only written out if a parameterized type is specified for the action output. The type attribute will carry the base type; the "type hint" attribute will carry the complete parameterized type.
5. Any change to the base type of a parameterized type will cause both the type and "type hint" attributes of the action output annotation to be updated.
6. A page input and action output must match on both the base type and parameter type in or to be considered in agreement.

In some embodiments, the action output annotation editor is operable to provide notification on automatic addition of page inputs by automatically inserting page input tags into a page when attaching a forward with action outputs to a page with no page input tags. In order to clue users in to what is going on, an informational message dialog can be triggered, which may carry an exemplary message like "One or more declarePageInput tags have been added to [pagename], corresponding to the action output annotations on forward [forwardname]. These tags declare the data expected by the page." The gestures that can trigger this dialog, assuming the other conditions exist, include but are not limited to:

Dropping a proper page onto a proper "unspecified" node in the flow editor.

Selecting Create from the context menu of a ghost page node or unspecified node referred to by a proper forward.

Reconnecting a proper forward to a proper page in the flow editor.

Choosing a proper page from the Forward To field in the action wizard when creating a proper action.

In some embodiments, a dialog warning notifying that there are mismatches on creation of input mismatch can be shown following the same gesture triggers described above (except for the second one), if a forward has action outputs that don't match the page inputs in the forwarded-to page. The message dialog should be warning level and an exemplary message can be read as the following: "The action outputs on forward [forwardname] do not match the page inputs expected by [pagename]. Do you want to resolve the mismatch now? [Yes][No]". A yes answer will launch the action output editor with the appropriate diagnostics, which a no answer will dismiss the dialog, set the forward's path to the page, and show appropriate diagnostics in the page flow design view.

Figure 7:
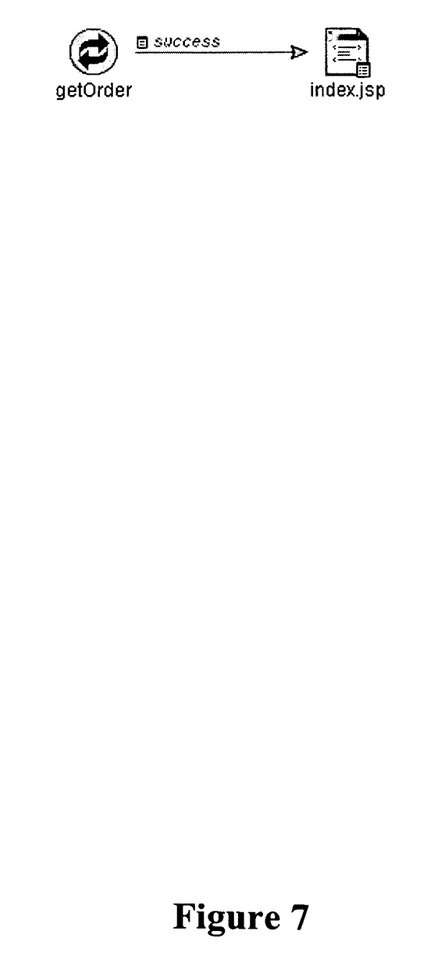
FIG. 7 is an illustration of an exemplary design view representation of action outputs and page inputs in one embodiment of the present invention.

In some embodiments, the action output annotation editor provide a design view representation of action outputs and page inputs as shown in FIG. 7, which shows a representation for both action outputs on the forward and page inputs on the page. In essence, the same designation on actions, forwards, and page nodes can be used to indicate that data is either expected or being passed. A tooltip over the forward label or page node can provide details on the action outputs or page inputs.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more computing devices to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Particularly, while the concept "module" is used in the embodiments of the systems and methods described above, it will be evident that such concept can be interchangeably used with equivalent concepts such as, class, method, type, interface, bean, component, object model, and other suitable concepts. While the concept "artifact" is used in the embodiments of the systems and methods described above, it will be evident that such concept can be interchangeably used with equivalent concepts such as, class, method, type, interface, bean, component, object model, and other suitable concepts. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A method for editing a page flow comprising a set of Web application files implementing a plurality of pages of a user interface, each page configured to receive page inputs and having a set of page input annotations representing data required by the page, and each page having a set of page actions configured to provide action outputs from the page and associated with a set of action output annotations representing data that the set of page actions provide to the page, the method comprising:

providing a page flow editor having an action output annotation editor;

receiving from a programmer, with the page flow editor, an identification of a selected page of the page flow;

generating, in response to said identification, an action output editor screen having a first pane and a second pane displayed simultaneously as part of said action output editor screen, and visually displaying said action output screen to said programmer;

displaying in the first pane of the action output editor screen a set of page input annotations representing data required by the selected page;

displaying in the second pane of the action output editor screen a set of action output annotations representing data provided to the selected page;

determining a type attribute and a type hint attribute for each of the set of action output annotations displayed in the second pane, wherein the type attribute carries a base type, and the type hint attribute carries the parameterized type;

comparing the set of page input annotations displayed in the first pane with both the type attribute associated with the base type, and the type hint attribute associated with the parameterized type of each of the set of action output annotations displayed in the second pane;

automatically detecting, based on said comparing, mismatches between the set of page input annotations displayed on the first pane and the set of action output annotations displayed on the second pane; and displaying on said action output editor screen diagnostics corresponding to said mismatches to facilitate programmer input resolving said mismatches between the set of page input annotations displayed in the first pane and the set of action output annotations associated displayed in the second pane by modifying the selected page or the page actions associated with the selected page.

2. The method according to claim 1, further comprising: automatically providing a notification with the action output annotation editor, and displaying said notification to said programmer, when an addition of a page input is detected.

3. The method according to claim 1, further comprising: automatically providing a notification with the action output annotation editor of mismatches between the set of page input annotations displayed on the first pane and the set of action output annotations displayed on the second pane, and displaying said notification to said programmer.

4. The method according to claim 1, further comprising: automatically resolving mismatches between the set of page input annotations displayed in the first pane and the set of action output annotations associated displayed in the second pane.

5. The method according to claim 1, further comprising:
providing a design view representation of the set of page input annotations representing data required by the selected page and the set of action output annotations representing data provided to the selected page.

6. The method according to claim 1, further comprising:
providing a page flow editor screen which provides an overview of the page flow;
allowing editing of the page flow from the page flow editor screen.

7. The method according to claim 1, further comprising:
providing a page flow editor screen which generates and displays routes of links between the plurality of nodes displayed in the overview of the page flow.

8. The method according to claim 1, further:
handling a plurality of data required by the page flow, wherein the plurality of data is parameterized to provide specific type system information.

9. A non-transitory machine readable storage medium having instructions stored thereon to support editing of a page flow comprising a set of Web application files implementing a plurality of pages of a user interface, each page configured to receive page inputs and having a set of page input annotations representing data required by the page, and each page having a set of page actions configured to provide action outputs from the page and associated with a set of action output annotations representing data that the set of page actions provide to the page, which instructions, when executed by one or more microprocessor cause the one or more microprocessor to perform steps comprising:
providing a page flow editor having an action output annotation editor;
receiving from a programmer, with the page flow editor, an identification of a selected page of the page flow;
generating, in response to said identification, an action output editor screen having a first pane and a second pane displayed simultaneously as part of said action output editor screen, and visually displaying said action output screen to said programmer;
displaying in the first pane of the action output editor screen a set of page input annotations representing data required by the selected page;
displaying in the second pane of the action output editor screen a set of action output annotations representing data provided to the selected page;
determining a type attribute and a type hint attribute for each of the set of action output annotations displayed in the second pane, wherein the type attribute carries a base type, and the type hint attribute carries the parameterized type;
comparing the set of page input annotations displayed in the first pane with both the type attribute associated with the base type, and the type hint attribute associated with the parameterized type of each of the set of action output annotations displayed in the second pane;
automatically detecting, based on said comparing, mismatches between the set of page input annotations displayed on the first pane and the set of action output annotations displayed on the second pane; and
displaying on said action output editor screen diagnostics corresponding to said mismatches to facilitate programmer input resolving said mismatches between the set of page input annotations displayed in the first pane and the set of action output annotations associated displayed in the second pane by modifying the selected page or the page actions associated with the selected page.

10. The non-transitory machine readable storage medium according to claim 9, comprising further instructions which, when executed by one or more microprocessor cause the one or more microprocessor to perform steps further comprising:
automatically providing a notification with the action output annotation editor, and displaying said notification to said programmer, when an addition of a page input is detected.

11. The non-transitory machine readable storage medium according to claim 9, comprising further instructions which, when executed by one or more microprocessor cause the one or more microprocessor to perform steps further comprising:
automatically providing a notification with the action output annotation editor of mismatches between the set of page input annotations displayed on the first pane and the set of action output annotations displayed on the second pane.

12. The non-transitory machine readable storage medium according to claim 9, comprising further instructions which, when executed by one or more microprocessor cause the one or more microprocessor to perform steps further comprising:
automatically resolving mismatches between the set of page input annotations displayed in the first pane and the set of action output annotations associated displayed in the second pane.

13. The non-transitory machine readable storage medium according to claim 9, comprising further instructions which, when executed by one or more microprocessor cause the one or more microprocessor to perform steps further comprising:
providing a design view representation of the set of page input annotations representing data required by the selected page and the set of action output annotations representing data provided to the selected page.

14. The non-transitory machine readable storage medium according to claim 9, comprising further instructions which, when executed by one or more microprocessor cause the one or more microprocessor to perform steps further comprising:
providing a page flow editor screen which provides an overview of the page flow;
allowing editing of the page flow from the page flow editor screen.

15. The non-transitory machine readable storage medium according to claim 9, comprising further instructions which, when executed by one or more microprocessor cause the one or more microprocessor to perform steps further comprising:
providing a page flow editor screen which generates and displays routes of links between the plurality of nodes displayed in the overview of the page flow.

16. The non-transitory machine readable storage medium according to claim 9, comprising further instructions which, when executed by one or more microprocessor cause the one or more microprocessor to perform steps further comprising:
handling a plurality of data required by the page flow, wherein the plurality of data is parameterized to provide specific type system information.

17. A system for editing a page flow comprising a set of Web application files implementing a plurality of pages of a user interface, each page configured to receive page inputs and having a set of page input annotations representing data required by the page, and each page having a set of page actions configured to provide action outputs from the page and associated with a set of action output annotations representing data that the set of page actions provide to the page, the system comprising:
one or more microprocessor;
a page flow editor operating on said one or more microprocessor wherein the page flow editor is configured to receive from a programmer an identification of a selected page of the page flow;

an action output annotation editor provided by said page flow editor wherein the action output annotation editor is configured to generate, in response to said identification, an action output editor screen, having a first pane and a second pane displayed simultaneously as part of said action output editor screen, and visually display said action output screen to said programmer;

wherein the first pane includes a set of page input annotations representing data required by the selected page;

wherein the second pane includes a set of action output annotations representing data provided to the selected page;

wherein the action output editor is configured to determine a type attribute and a type hint attribute for each of the set of action output annotations displayed in the second pane, wherein the type attribute carries a base type, and the type hint attribute carries the parameterized type;

wherein the action output editor is configured to compare the set of page input annotations displayed in the first pane with both the type attribute associated with the base type, and the type hint attribute associated with the parameterized type of each of the set of action output annotations displayed in the second pane;

wherein the action output editor is configured to detect based on said comparing, mismatches between the set of page input annotations displayed on the first pane and the set of action output annotations displayed on the second pane; and wherein the action output editor is configured to display on said action output editor screen, diagnostics corresponding to said mismatches, to facilitate programmer input to resolve said mismatches between the set of page input annotations displayed in the first pane and the set of action output annotations associated displayed in the second pane by modifying the selected page or the page actions associated with the selected page.

18. The system of according to claim 17, wherein:

the action output editor is configured to automatically display a notification to said programmer when an addition of a page input is detected.

19. The system of according to claim 17, wherein:

the action output editor is configured to automatically provide a notification with the action output annotation editor of mismatches between the set of page input annotations displayed on the first pane and the set of action output annotations displayed on the second pane.

20. The system of according to claim 17, wherein:

the action output editor is configured to provide a design view representation of the set of page input annotations representing data required by the selected page and the set of action output annotations representing data provided to the selected page.

* * * * *